(12) United States Patent
Bhatti et al.

(10) Patent No.: US 7,986,065 B2
(45) Date of Patent: Jul. 26, 2011

(54) SEALED ROLLED POLE HOUSING FOR AN ELECTRIC MOTOR

(75) Inventors: Irfan A Bhatti, Farmington Hills, MI (US); Mark K Besenti, Lucas, OH (US)

(73) Assignee: Robert Bosch GmbH, Stuttgart (DE)

( * ) Notice: Subject to any disclaimer, the term of this patent is extended or adjusted under 35 U.S.C. 154(b) by 362 days.

(21) Appl. No.: 12/156,745

(22) Filed: Jun. 4, 2008

(65) Prior Publication Data

US 2009/0302701 A1 Dec. 10, 2009

(51) Int. Cl.
*H02K 5/04* (2006.01)
*H02K 5/15* (2006.01)
*H02K 5/10* (2006.01)

(52) U.S. Cl. ............... 310/89; 310/154.14; 310/430

(58) Field of Classification Search .............. 310/45, 310/88, 89, 154.08, 154.09, 154.14, 154.15, 310/216.068, 402, 428, 430, 40 MM
See application file for complete search history.

(56) References Cited

U.S. PATENT DOCUMENTS

| 1,822,342 | A | * | 9/1931 | Ehrlich ........................ 310/91 |
| 4,372,035 | A | | 2/1983 | McMillen |
| 4,471,246 | A | | 9/1984 | Paillet |
| 4,668,887 | A | * | 5/1987 | D'Argouges et al. ..... 310/154.14 |
| 4,727,274 | A | | 2/1988 | Adam et al. |
| 5,113,103 | A | | 5/1992 | Blum et al. |
| 5,731,646 | A | * | 3/1998 | Heinze et al. ................ 310/89 |
| 6,624,543 | B1 | | 9/2003 | Bankstahl |
| 6,700,269 | B2 | * | 3/2004 | Torii et al. ............... 310/154.08 |
| 7,196,448 | B2 | * | 3/2007 | Chen et al. ............. 310/216.001 |
| 2006/0071567 | A1 | * | 4/2006 | Acosta .................... 310/154.08 |

OTHER PUBLICATIONS

Poz, Alberto Dal;"An Application of the Roll-Forming Process on the Production of a Waterproof Metal Motor Housing"; Date Published: Apr. 16, 2007; Paper No: 2007-01-1677 ; DOI: 10.4271/2007-01-1677.*

* cited by examiner

*Primary Examiner* — Tran Nguyen
*Assistant Examiner* — David W. Scheuermann
(74) *Attorney, Agent, or Firm* — Baker & Daniels LLP

(57) ABSTRACT

A rolled pole housing for an electric motor includes a sealed enclosure formed by a frame body, a flange and an end cap. Therefore, the rolled pole housing may be used in both sealed and unsealed applications.

25 Claims, 7 Drawing Sheets

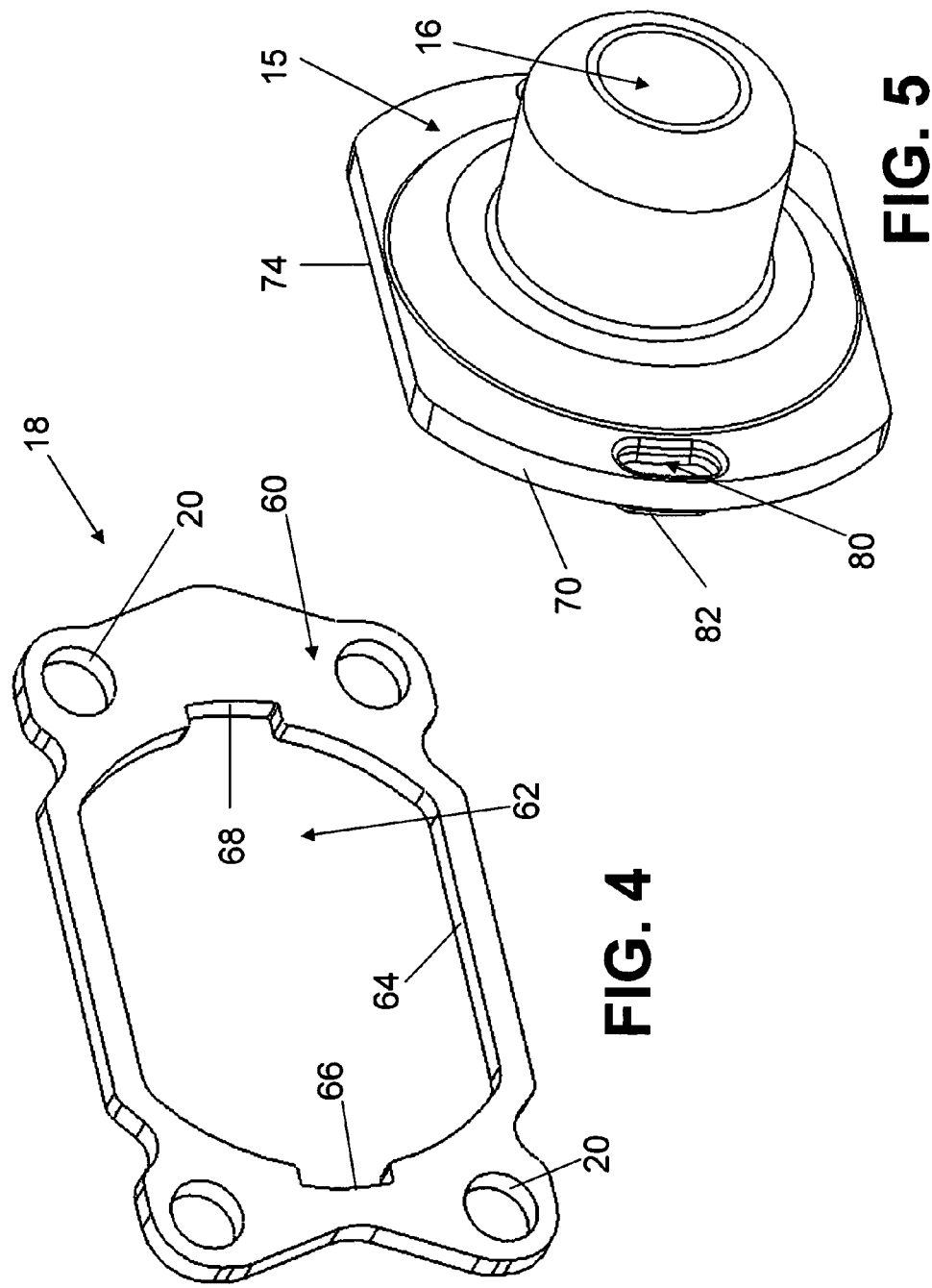

SEALED ROLLED POLE HOUSING FOR AN ELECTRIC MOTOR

FIELD OF THE INVENTION

The present invention relates generally to electric motors. More particularly, the present invention relates to an improved pole housing for an electric motor.

BACKGROUND AND SUMMARY OF THE INVENTION

Electrical motors, such as actuator motors used in automotive applications, typically include a metal pole housing configured to receive magnets and an armature to form the electric motor. These metal pole housings are used to maintain a magnetic circuit of the electric motor in a closed field or loop manner. Therefore, the motor operates by having the armature turn inside the pole housing when a voltage is supplied to the motor. When an electric motor is energized, the armature rotates because wires on the armature are arranged relative to the magnetic field so that torque is developed about an axis of rotation of the armature. The armature includes a shaft having a first end portion which extends into a nose of the pole housing. The armature shaft also includes a second end portion which extends into a gear box. In order to support the rotating armature, first and second bushings are typically used on the first and second end portions, respectively, of the armature shaft.

Metal pole housings are produced using a variety of different manufacturing processes. For example, the pole housings may be formed by a deep drawn stamping process, a rolling process, an extrusion process, or other forming process. The cost of an electric motor changes significantly depending upon the type of manufacturing process used for the metal pole housings.

Typically, a deep drawn stamping process is used to manufacture metal motor pole housings for applications where water sealing is required. Deep drawn metal stamping processes are specialized and sophisticated. Therefore, few suppliers are able to meet an established stringent engineering requirement. As a result, product design and tooling costs are high for such deep drawn metal stamping designs. In addition, the material used in the deep drawn stamping processes is much more expensive than the material used in a rolled metal process.

Rolled metal pole housings are often used for electric motors where water sealing is not a requirement. Since the rolling or forming process is a relatively simple process, design and tooling costs are much less than those associated with the deep drawn stamping processes. Rolled pole housings advantageously have an outer wall with a uniform thickness. Rolled pole housings may also be made in varying lengths without a change in tooling which would be required in the deep drawn stamping process. However, conventional pole housings made using the rolling process are not water tight. Therefore, such conventional rolled pole housings are used for unsealed applications.

The present invention also provides an improved rolled pole housing which meets water sealing requirements. The present invention provides significant costs advantages, especially compared to deep drawn metal stamping processes.

According to an illustrated embodiment of the present invention, a pole housing for an electric motor comprises a frame body formed from a sheet of material. The frame body has a first end, a second end, and at least one seam. The seam is sealed along its length. The pole housing also includes a flange formed from a sheet of material, the flange having an opening formed therein. An entire periphery of the first end of the frame body is sealed to the flange. The pole housing further includes an end cap formed from a sheet of material. The end cap has a nose configured to receive an end of an armature shaft therein. The end cap is coupled to the second end of the frame body and sealed thereto to provide a sealed enclosure.

In an illustrated embodiment, the frame body is formed from a single sheet of material having first and second tabs extending from the first end. The first and second tabs are configured to enter first and second notches, respectively, formed in the flange to hold the frame body in position relative to the flange.

According to an illustrated embodiment of the present invention, a method of making a pole housing for an electric motor comprises forming a frame body from a sheet of material, forming a flange from a sheet of material, and forming an end cap from a sheet of material. The frame body has a first end, a second end and at least one seam. The flange has an opening therein, and the end cap includes a nose configured to receive an end of an armature shaft of an electric motor therein. The illustrated method also includes placing the flange adjacent the first end of the frame body, placing the end cap adjacent the second end of the frame body, sealing the at least one seam of the frame body, sealing the flange to the first end of the frame body, and sealing the end cap to the second end of the frame body to form a sealed enclosure.

In one illustrated embodiment, the sealing steps are performed using a laser welding process. Also in one illustrated embodiment, the steps of placing the flange adjacent the first end of the frame body and placing the end cap adjacent the second end of the frame body occur prior to the sealing steps.

In an illustrated embodiment, the end cap and the flange are formed from a single blank of material. Illustratively, the nose of the end cap is formed from the single blank of material leaving a large, flat flange attached. The flange of the pole housing is then cut from the large, flat flange attached to the end cap.

Additional features of the present invention will become apparent to those skilled in the art upon consideration of the following detailed description of illustrative embodiments exemplifying the best mode of carrying out the invention as presently perceived.

BRIEF DESCRIPTION OF THE DRAWINGS

The above-mentioned and other features of this invention, and the manner of attaining them, will become more apparent and the invention itself will be better understood by reference to the following description of illustrated embodiments of the invention taken in conjunction with the accompanying drawings, wherein:

FIG. 4 is a perspective view illustrating a flange of the pole housing;

FIGS. 5 and 6 are perspective views illustrating an end cap of the pole housing;

DETAILED DESCRIPTION OF THE DRAWINGS

Figure 1:
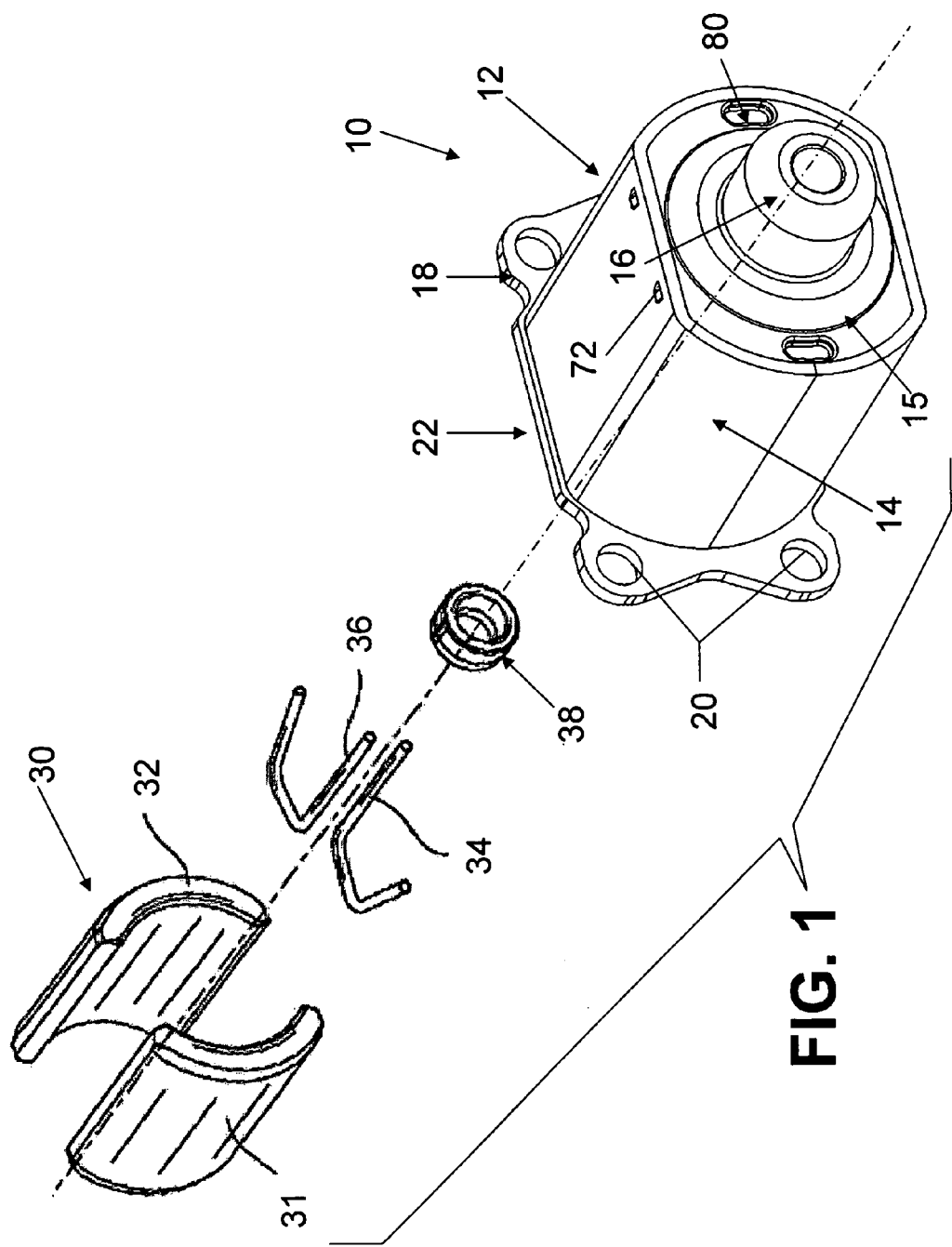
FIG. 1 is an exploded perspective view of an illustrated embodiment of a rolled pole housing of the present invention configured to receive a magnet structure and an armature (not shown) to provide an electric motor.

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected" and "coupled" are used broadly and encompass both direct and indirect mounting, connecting, and coupling.

Referring now to the drawings, FIGS. 1-4 illustrate an embodiment of a rolled pole housing 10 of the present invention. The pole housing 10 includes an enclosure 12 defined by a frame body 14, an end cap 15, and an attachment flange 18. The attachment flange 18 includes a plurality of apertures 20 configured to receive fasteners (not shown) to couple the pole housing 10 to a support structure (not shown) such as, for example, a gear box within a vehicle or other location. A conventional connector or brush card assembly (not shown) is coupled to an open end 22 of the enclosure 12 adjacent flange 18. A suitable seal such as a rubber gasket over molded onto an interface portion of the brush card is provided to seal an interior region 24 (see FIG. 6) of the enclosure 12. The brush card assembly also includes an electrical connector which interfaces with a wire harness (not shown) that provides power, ground and other control connections to the electric motor.

A magnet structure 30, such as a pair of permanent magnets 31 and 32, is located within the interior region 24 of the enclosure 12. Magnets 30 and 32 are illustratively held in position by first and second spring clips 34 and 36. A bushing or bearing 38 is configured to be inserted into a nose 16 of end cap 15 to support an end of an end of an armature shaft (not shown).

Figure 2:
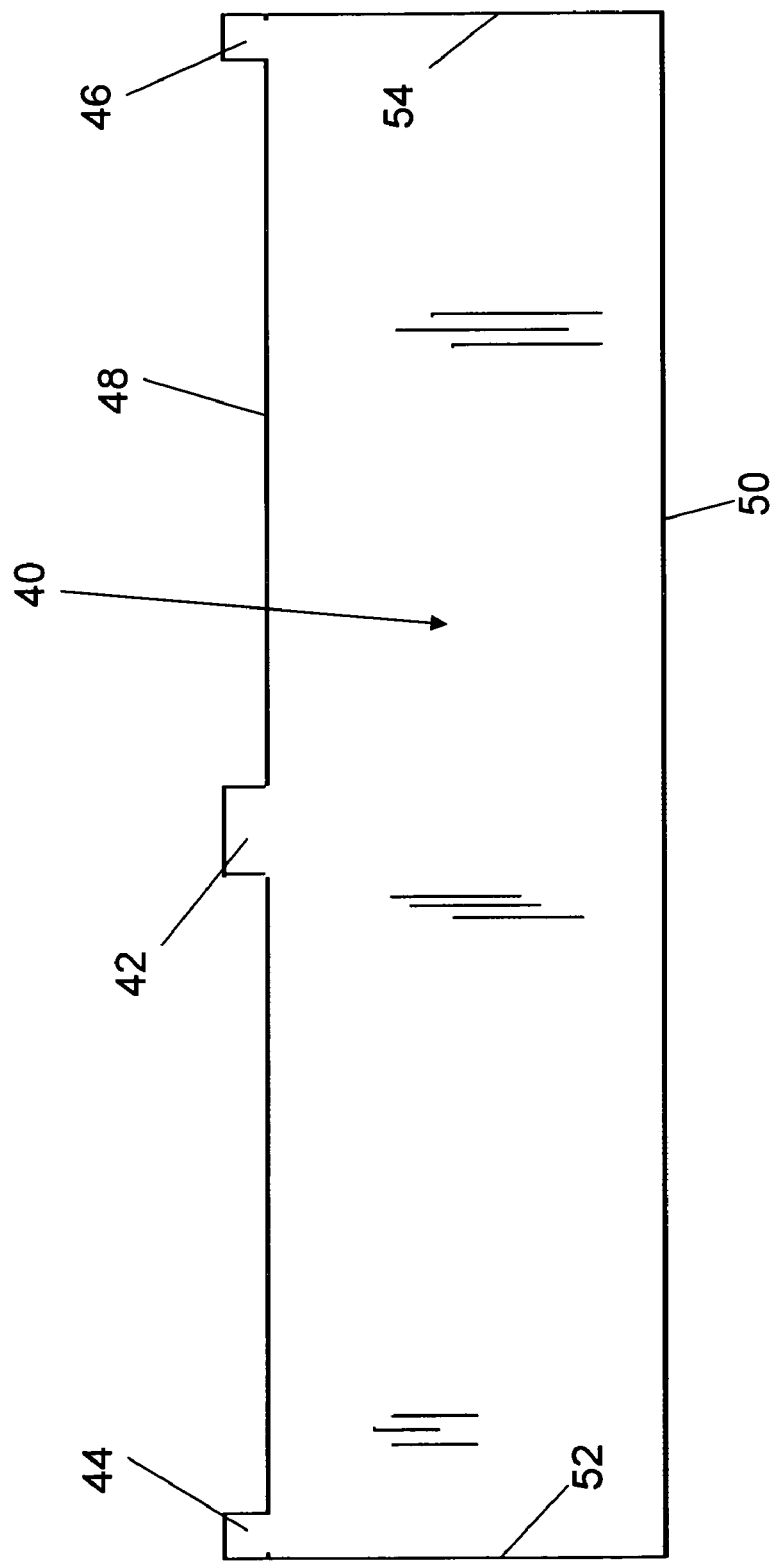
FIG. 2 is a plan view illustrating a sheet of material used to form a frame body of the rolled pole housing.

The rolled pole housing 10 of the present invention is designed to be used in both sealed and unsealed applications. In the illustrated embodiment, the frame body 14, the end cap 15, and the flange 18 are initially formed as three separate pieces. FIG. 2 illustrates a piece of sheet metal 40 or other suitable metal material used to form frame body 14. In the illustrated embodiment, sheet 40 is formed to include a center tab 42 and first and second end tabs 44 and 46, respectively, extending from a first end 48 of sheet 40. A second end 50 of sheet 40 is spaced apart from the first end 48. Tab 44 is located adjacent a first side edge 52 of sheet 40, and tab 46 is located adjacent a second side edge 54 of sheet 40.

Figure 3:
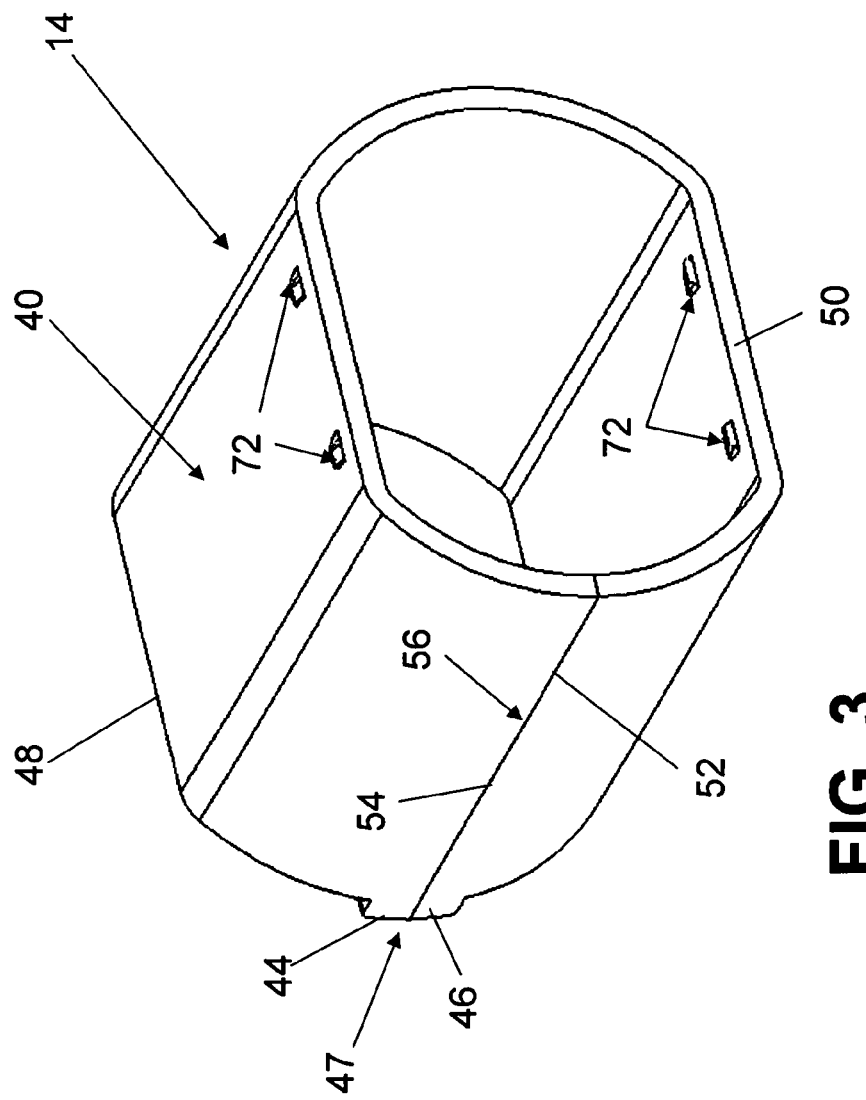
FIG. 3 is a perspective view of the frame body after the sheet of material has been formed into the desired shape for the frame body.

Sheet 40 is rolled or otherwise formed with a suitable tool to form the desired shape of frame body 14 as best shown in FIG. 3. During the formation process, first and second side edges 52 and 54 of sheet 40 are positioned to abut each other. Therefore, end tabs 44 and 46 are positioned to form a combined tab 47 having a size approximately the same as center tab 42. An interface of first and second side edges 52 and 54 of sheet 40 provides a seam 56. Illustratively, the seam 56 is fused or otherwise sealed together through a suitable sealing process, such as a laser welding process, to form a sealed frame body 14. Tag welding at spaced apart intervals may be used on seam 56 for unsealed applications.

Figure 6:
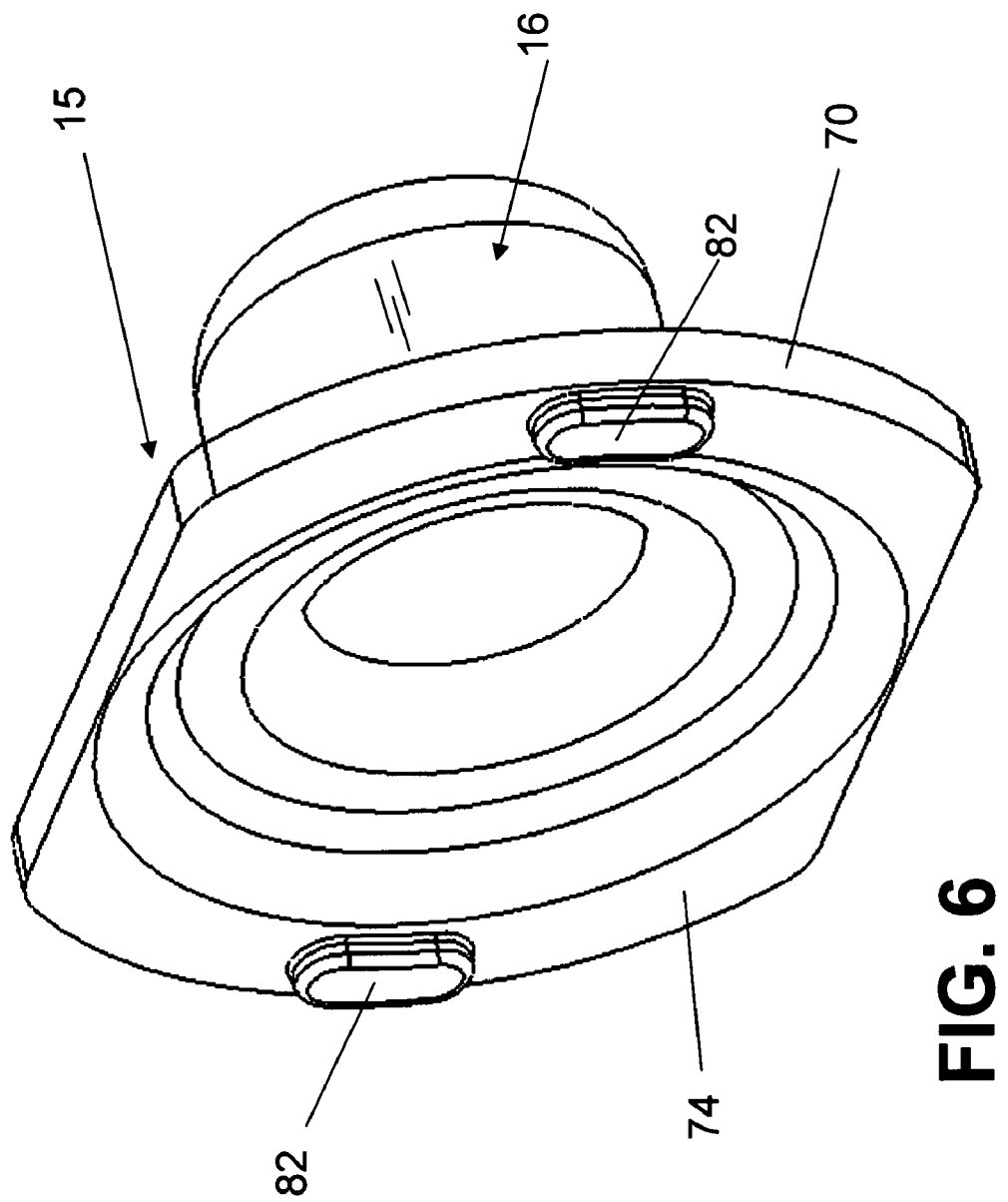

The flange 18 and end cap 15 are best shown in FIGS. 4-6. Initially, a single sheet metal blank may be used to form both the flange 18 and end cap 15. As shown in FIG. 4, flange 18 includes a body portion 60 formed to include a plurality of mounting apertures 20 as discussed above. An internal opening 62 is defined by an inner wall 64. Opening 62 illustratively has the same shape as the first end 48 of frame body 14.

Flange 18 also includes notched portions 66 and 68 configured to receive tabs 47 and 42 of frame body 14, respectively, during assembly. As best shown in FIG. 6, the combined tab 47 formed by end tabs 44 and 46 is configured to enter notch 66 of flange 18 during assembly. The opposite tab formed by center tab 42 which is configured to enter notch 68. Therefore, the tabs 47 and 42 located within notches 66 and 68, respectively, help locate and hold the frame body 14 in position relative to the flange 18 during assembly.

Figure 8:
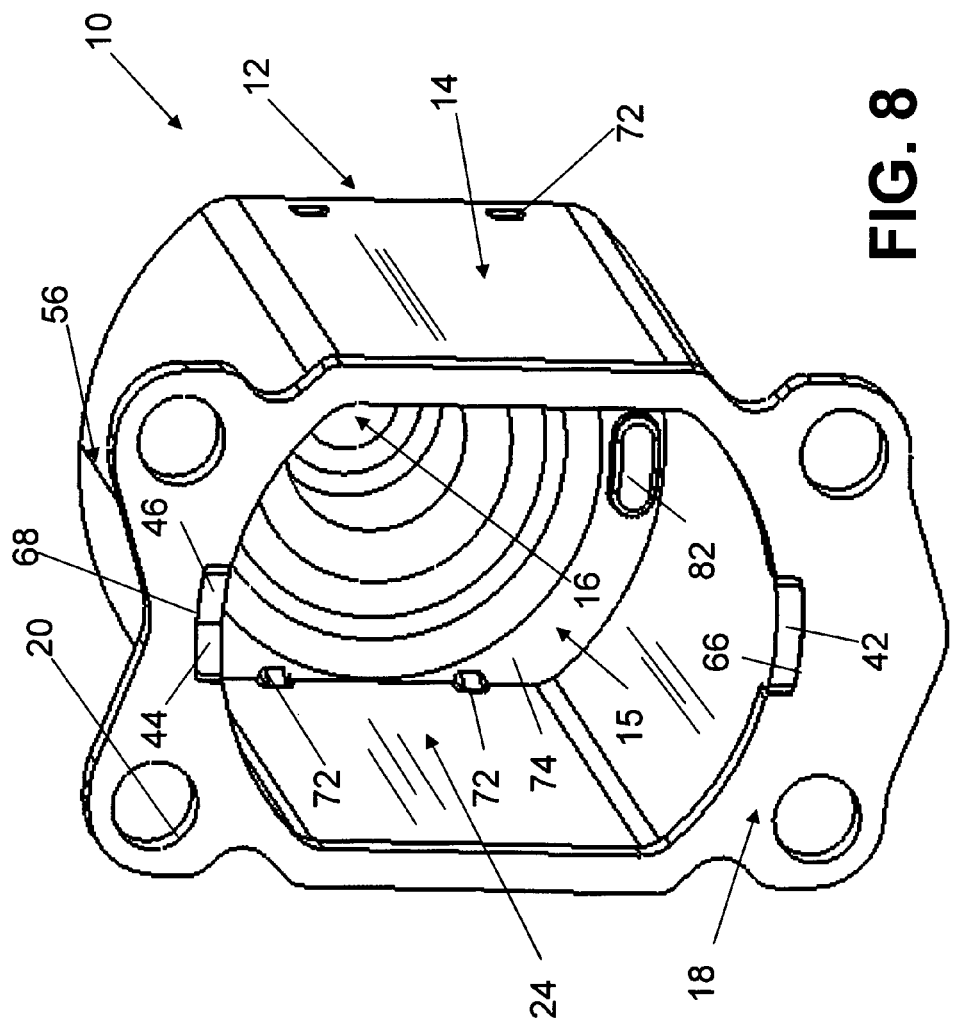
FIG. 8 is a perspective view of the assembled rolled pole housing illustrating an interior region of the sealed enclosure of the pole housing.

The end cap 15 best shown in FIGS. 5 and 6 has an outer edge surface 70 having the same shape as inner wall 64 defining the opening 62 of flange 18. Therefore, the end cap 15 may be formed from the same blank of material as flange 18 to save material cost. In the illustrative embodiment, the end cap 15 is first drawn into the shape of FIG. 5 (or other suitable shape) with a large, flat flange attached. The end cap 15 is subsequently separated from the large, flat attached flange through a metal blanking or cutting process which also forms flange 18. Therefore, the opening 62 of flange 18 has the same shape as outer edge 70 of end cap 15. End cap 15 is illustratively formed to include spaced apart depressions 80 which form projections 82 extending inwardly from the inner surface 74 as best shown in FIGS. 6 and 8. Projections 82 provide seats to support the magnets 31 and 32 and reduce the contact area between the magnets 31 and 32 and inner surface 74 of end cap 15.

In one illustrated embodiment, frame body 14 is formed to include a plurality of inwardly extending lances or protrusions 72. These protrusions 72 are illustratively formed by deforming the sheet 40 without penetrating the sheet 40. In one illustrated embodiment, the protrusions 72 provide a support for end cap 15 during assembly. For example, an inner surface 74 of end cap 15 may rest against the protrusions 72 during assembly as best shown in FIG. 8.

In another embodiment, a core or mandrel supports the end cap 15 without the need for the protrusions 72 or other support structure on the frame body 14. In this alternative embodiment, the outer edge 70 of end cap 15 illustratively engages an inner surface of frame body 14 to provide a light press fit to retain the end cap 15 in position relative to the frame body 14 for welding.

Figure 7:
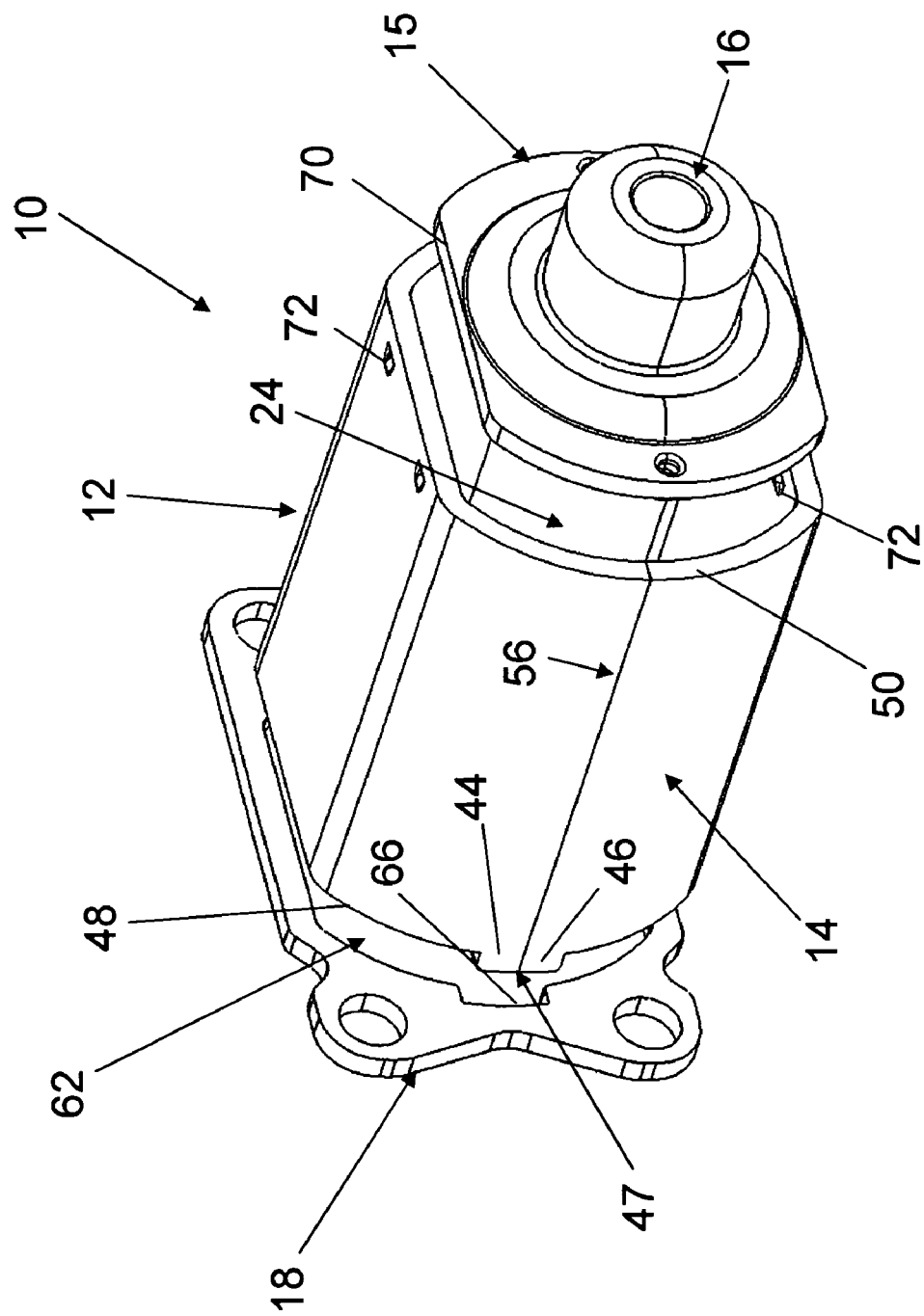
FIG. 7 is a perspective view illustrating assembly of the flange, the frame body and the end cap to form the rolled pole housing of the present invention.

FIG. 7 illustrates the frame body 14, end cap 15, and flange 18 during an assembly process. As discussed above, seam 56 of frame body 14 is illustratively welded using a laser welding process, for example, or other suitable process to seal the seam 56. Likewise, an interface between flange 18 and first end 48 of frame body 14 is sealed with a similar welding process, such as a laser welding process, or other suitable process. An outer periphery of end cap 15 defined by edge 70 is also sealed to end 50 of frame body 14 through a similar welding process, such as a laser welding process, or other suitable sealing process. The end cap 15 and frame body 14 are free from any apertures or openings in communication with the interior region of the enclosure 12 (except for open end 22 which is sealed by the seal of the brush card assembly). Therefore, the improved rolled pole housing 10 of the present invention provides a water tight, sealed enclosure 12 which may be used in either sealed or unsealed applications. For unsealed applications, spaced apart tag welds may be used instead of continuous welding.

In an illustrated embodiment, the rolled pole housing 10 is covered with a coating applied during a coating process. In illustrative embodiments, an E-coat process or an A-coat or Autophoretic® process may be used to apply the coating. In one illustrative embodiment, the coating is a paint, although any suitable material, sealant, coating or plating may be used. The coating process improves corrosion protection for the rolled pole housing 10. Illustratively, the rolled pole housing may operate 400-500 hours or more without corrosion when covered with a suitable coating. In addition, the coating may improve the appearance of the rolled pole housing. For instance, some customers may prefer a black colored coated pole housing 10. The coating process also improves sealing characteristics of the rolled pole housing 10. Finally, the coating process improves sound damping characteristics of the rolled pole housing 10.

The rolled pole housing 10 of the present invention provides significant cost advantages compared to conventional deep drawn pole housings which are typically used for sealed applications. The rolled pole housing 10 of the present invention meets the stringent engineering requirements for water sealing. The sealed rolled pole housing 10 illustratively has a uniform thickness along its length since the frame body 14 has a uniform thickness. Such uniform thickness is difficult to achieve in deep drawn processes which stretch and thin the material during formation. Adjusting the length of the rolled pole housing 10 does not require major tooling costs. The length of frame body 14 may be increased to increase the length of the pole housing 10. In contrast, a deep drawn process requires new tooling to adjust the length of the pole housing. In addition, major production line changes are not required to implement the design of the improved rolled pole housing 10.

While the invention has been illustrated and described in detail in the drawings and foregoing description, the description is to be considered as illustrative and not restrictive in character. Variations and modifications exist within the scope and spirit of the present invention as described and defined herein and in the following claims.

What is claimed is:

1. A pole housing for an electric motor, the pole housing comprising:
    a frame body formed from a sheet of material, the frame body having a first end, a second end, and at least one seam, the seam being sealed along its length;
    a flange formed from a sheet of material, the flange having an opening formed therein, an entire periphery of the first end of the frame body being sealed to the flange;
    an end cap formed from a sheet of material, the end cap having a nose configured to receive an end of an armature shaft therein, the end cap being coupled to the second end of the frame body and sealed thereto to provide a sealed enclosure, and the end cap being formed to include at least one projection extending into the interior region of the sealed enclosure; and
    a magnet structure located within an interior region of the sealed enclosure, the at least one projection of the end cap being configured to support the magnet structure within the interior region.

2. The pole housing of claim 1, wherein the frame body is formed from a single sheet of material having first and second tabs extending from the first end, the first and second tabs being configured to enter first and second notches, respectively, formed in the flange to hold the frame body in position relative to the flange.

3. The pole housing of claim 2, wherein the single sheet of material has a center tab configured to define the first tab and first and second end tabs positioned adjacent each other and configured to define the second tab of the frame body.

4. The pole housing of claim 1, wherein the flange and the end cap are formed from a single blank of material.

5. The pole housing of claim 1, wherein the frame body includes a plurality of inwardly extending protrusions configured to support the end cap thereon.

6. The pole housing of claim 1, wherein the flange is formed to include a plurality of mounting apertures.

7. The pole housing of claim 1, further comprising an armature located in the interior region of the sealed enclosure, the armature including an armature shaft having a portion located in the nose of the housing, the armature and armature shaft being rotatable relative to the magnet structure.

8. The pole housing of claim 1, wherein the magnet structure includes first and second permanent magnets located within the interior region of the sealed enclosure.

9. The pole housing of claim 8, further comprising at least one spring clip located within the interior region of the sealed enclosure to hold the first and second permanent magnets within the sealed enclosure.

10. The pole housing of claim 1, further comprising a coating located on the frame body, the flange, and the end cap.

11. The pole housing of claim 10, wherein the coating is a paint.

12. The pole housing of claim 1, further comprising a bearing located in the nose of the end cap, the bearing being configured to receive the end of the armature shaft therein.

13. The pole housing of claim 1, wherein the end cap includes an outer edge which is sealed to the second end of the frame body to provide the sealed enclosure.

14. A pole housing for an electric motor, the pole housing comprising:
    a frame body formed from a sheet of material, the frame body having a first end, a second end, a plurality of inwardly extending protrusions, and at least one seam, the seam being sealed along its length;
    a flange formed from a sheet of material, the flange having an opening formed therein, an entire periphery of the first end of the frame body being sealed to the flange; and
    an end cap formed from a sheet of material, the end cap having a nose configured to receive an end of an armature shaft therein, the end cap being coupled to the second end of the frame body and sealed thereto to provide a sealed enclosure, the plurality of inwardly extending protrusions of the frame body being configured to support the end cap thereon.

15. The pole housing of claim 14, further comprising a magnet structure located within an interior region of the sealed enclosure.

16. The pole housing of claim 15, wherein the end cap is formed to include at least one projection extending into the interior region of the sealed enclosure, the at least one projection being configured to support the magnet structure within the interior region.

17. The pole housing of claim 14, wherein the frame body is formed from a single sheet of material having first and second tabs extending from the first end, the first and second tabs being configured to enter first and second notches, respectively, formed in the flange to hold the frame body in position relative to the flange.

18. The pole housing of claim 17, wherein the single sheet of material has a center tab configured to define the first tab and first and second end tabs positioned adjacent each other and configured to define the second tab of the frame body.

19. The pole housing of claim 14, wherein the flange and the end cap are formed from a single blank of material.

20. The pole housing of claim 14, further comprising a magnet structure located within an interior region of the sealed enclosure, and an armature located in the interior region of the sealed enclosure, the armature including an armature shaft having a portion located in the nose of the housing, the armature and armature shaft being rotatable relative to the magnet structure.

21. The pole housing of claim 20, wherein the magnet structure includes first and second permanent magnets located within the interior region of the sealed enclosure, and further comprising at least one spring clip located within the interior region of the sealed enclosure to hold the first and second permanent magnets within the sealed enclosure.

22. The pole housing of claim 14, further comprising a coating located on the frame body, the flange, and the end cap.

23. The pole housing of claim 22, wherein the coating is a paint.

24. The pole housing of claim 14, further comprising a bearing located in the nose of the end cap, the bearing being configured to receive the end of the armature shaft therein.

25. The pole housing of claim 14, wherein the end cap includes an outer edge which is sealed to the second end of the frame body to provide the sealed enclosure.

* * * * *